Aug. 1, 1944. J. G. STRADLING ET AL 2,354,782
FOLDING POCKET TEXT OR WORK BOOK AND BINDER
Filed Jan. 8, 1943

INVENTORS
James G. Stradling
and Lyle F. Hance
BY
Augustus B. Stoughton
ATTORNEY.

WITNESS:

Patented Aug. 1, 1944

2,354,782

UNITED STATES PATENT OFFICE 2,354,782

FOLDING POCKET TEXT OR WORK BOOK AND BINDER

James G. Stradling, Philadelphia, and Lyle F. Hance, Abington, Pa.

Application January 8, 1943, Serial No. 471,660

2 Claims. (Cl. 281—16)

The principal objects of the present invention are: to provide a full-size text and work book which folds into the binder, can be carried in the pocket, and is adapted for the use of service men, pilots, mechanics, industrial employees and the like whose work requires frequent reference to industrial materials; to provide a work book format which can be folded to pocket size and unfolded to full-size; to provide a folding pocket text or work book having two books in a binder of which one may furnish instructions and the other can provide solutions or processes and working sheets; and to provide a book of the character referred to which will lie flat and which can be used as a log book particularly by aviators.

Other objects of the invention will appear from the following description at the end of which the invention will be claimed.

Generally stated, the invention comprises the improvements to be presently described and finally claimed.

In the following description, reference will be made to the accompanying drawing forming part hereof and in which.

Figure 1:
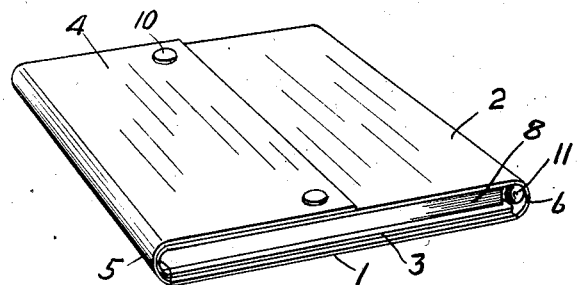
Fig. 1 is a perspective view of a work book embodying features of our invention showing the same folded for insertion into the pocket.
Figure 2:
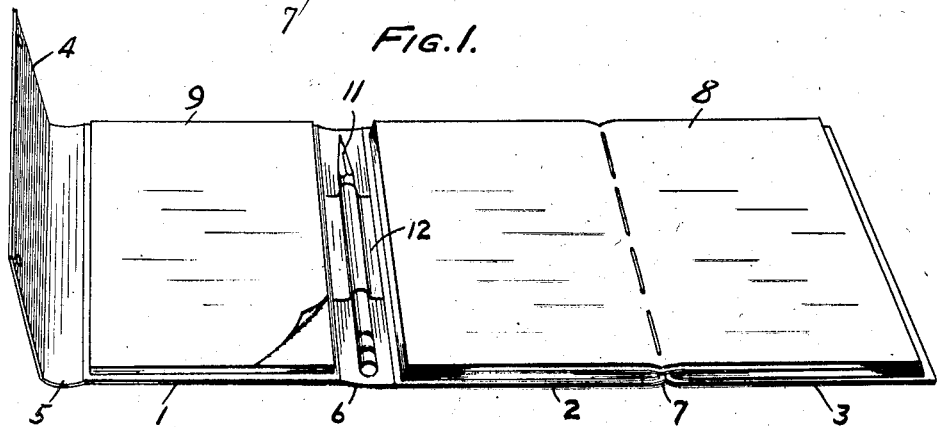
Fig. 2 is a perspective view showing the book in open position.
Figure 3:
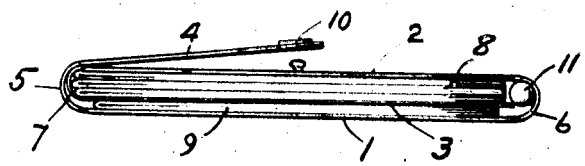
Fig. 3 is an end view of the book.

Referring to the drawing, there is a generally oblong cover having three rectangular boards 1, 2 and 3, of substantially the same width and having one rectangular end board 4 of substantially half that width. The cover also includes a covering of water- and vermin-proof cloth applied to the boards and defining three joints 5, 6 and 7 between the boards. The cover is adapted to be folded three times with the end board portion 4 outside, as shown in Fig. 1, and to be spread flat as shown in Fig. 2. 8 is a group of comparatively wide saddle-stitched leaves applied at the joint 7 between the boards of the same size, and 9 is a group of comparatively narrow saddle-stitched leaves applied at the joint 5 between the small board and the large board 1. The group of leaves 9 may be so applied with the gutter edges at or near the joint 5 by pasting one of the outside leaves to the board 1. 10 indicates snap-fasteners for holding the book in closed position and 11 indicates a lead pencil arranged in a loop 12 provided on the inside of the joint 6. It may be said that there are provided two saddle-stitched books 8 and 9 within the cover.

The described format of the book lends itself to a variety of uses. For example, the pages of the book 8 may have printed upon them problems, leaving oblong space in which the user may write out his solution of the problem, and in the book 9 there may be printed the text of the solutions of the problems and possibly the answers, and the pages in the two books may be correspondingly numbered. Again, the pages of the book 9 may contain text setting forth the underlying principles of an art or science, and the pages of the book 8 may set forth problems requiring the application of those principles and leaving space for the user to write down his solutions of the problems.

The book is also useful as a log book for aviators and many other uses will readily suggest themselves.

Since the work book is intended for the use of servicemen, pilots, mechanics and the like, it is an advantage that it will lie flat on the lap or knees of the user; and it is a further advantage that, when either of the books is opened, its pages will lie flat so that it may be conveniently used for its intended purpose. The book 9 opens toward the left and, when all the boards are in substantially the same plane, the open leaves of the book 9 are supported by or rest upon the small board 4 substantially flush with the leaves of the book 8 so that the book, as a whole, lies substantially flat.

It will be obvious to those skilled in the art to which the invention relates that modifications may be made in details of construction and arrangement and in matters of mere form without departing from the spirit of the invention which is not limited to such matters or otherwise than the appended claims may require.

We claim:

1. A folding pocket text or work book and binder consisting of the combination of, a generally oblong cover having three rectangular boards of substantially the same width and one rectangular end board of substantially half that width, a covering of water- and vermin-proof cloth defining three joints between the boards, the cover adapted to be folded three times with the end board portion outside and to be spread flat, a group of comparatively wide saddle-stitched leaves permanently applied at the joint between the boards of the same width, and a group of comparatively narrow saddle-stitched leaves permanently applied at the joint between the small board and the other large board and adapted to open onto and lie upon the small board, the leaves of one group being spaced clear of the leaves of the other group at their confronting edges and at the center joint.

2. A folding pocket text or work book and binder comprising, a generally oblong cover having three rectangular boards of substantially the same width and one rectangular end board of less width, a cover defining three joints between the boards, a comparatively large saddle-stitched book of leaves permanently applied to the joint between the boards of the same width, and a comparatively narrow book of saddle-stitched leaves applied to the other joint, the confronting edges of leaves of the respective books being arranged in close spaced delation at the center joint.

JAMES G. STRADLING.
LYLE F. HANCE.